C. A. PATTERSON.
BUTTER CUTTER.
APPLICATION FILED OCT. 27, 1914.

1,132,378.

Patented Mar. 16, 1915.

Witnesses.
Frederick L. Fox.
H. M. Little

Inventor
C. A. Patterson

By Gould & Gould.
Attorneys

UNITED STATES PATENT OFFICE.

CHARLES A. PATTERSON, OF PORTLAND, OREGON.

BUTTER-CUTTER.

1,132,378.   Specification of Letters Patent.   Patented Mar. 16, 1915.

Application filed October 27, 1914. Serial No. 868,803.

*To all whom it may concern:*

Be it known that I, CHARLES A. PATTERSON, a citizen of the United States, residing at Portland, in the county of Multnomah and State of Oregon, have invented certain new and useful Improvements in Butter-Cutters, of which the following is a specification.

The invention relates to an improvement in butter cutters, of that type wherein a single operation is designed to produce a series of individual butter blocks, the cutter operating to completely sever and space the individual blocks, so that they may be readily and easily handled.

The butter cutter of the present invention comprehends a plurality of transverse knives or blades and a longitudinal blade coöperating with all of the transverse blades, so as to utilize the transverse blades on each side of the longitudinal blade as a cutter, the transverse blades being specifically formed with relation to the frame and held in position by the longitudinal blade, the desired rigidity of structure being secured by the strain or tension on the longitudinal blade only.

Figure 1:
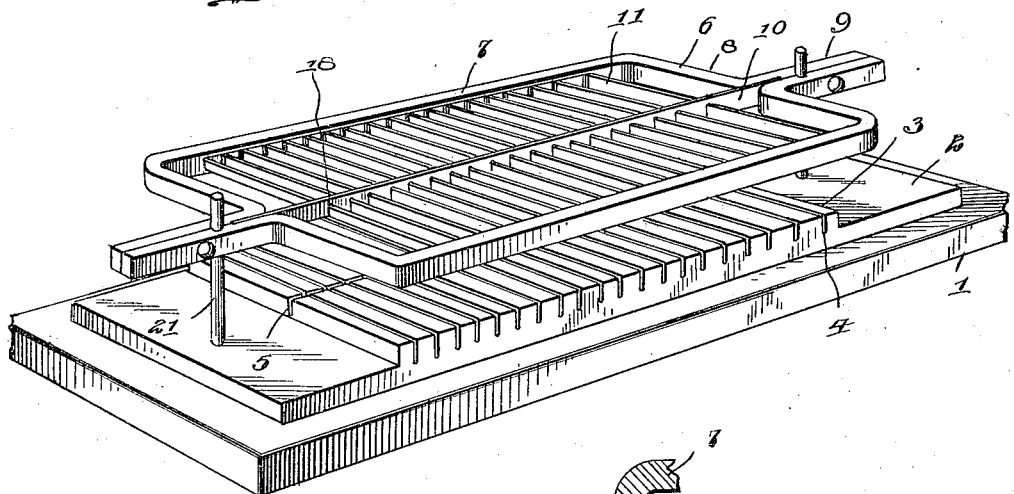
Figure 2:
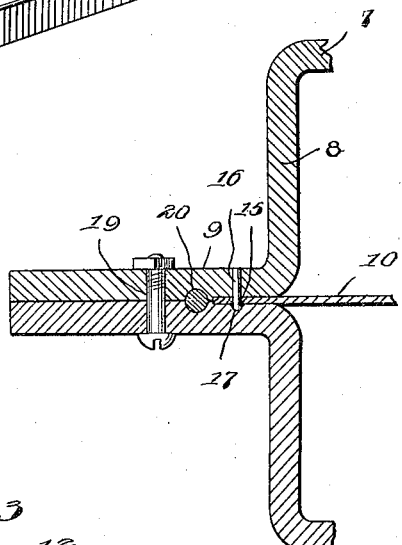
Figure 3:
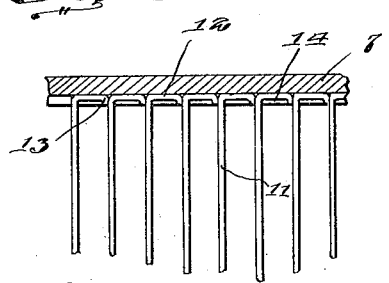

The invention in the preferred form of details will be described in the following specification, reference being had particularly to the accompanying drawings, in which:

Figure 1 is a perspective view of the improved butter cutter; Fig. 2 is an enlarged broken sectional view of a portion of the cutting frame, showing particularly the means for maintaining the longitudinal blade under proper tension; Fig. 3 is a broken sectional view partly in elevation of a portion of the cutter frame and the transverse blade associated therewith, illustrating particularly the means for holding said transverse blades in position within the frame and in proper relatively spaced relation.

The improved butter cutter comprises a base 1 of suitable proportions and weight on which is mounted a block 2, preferably but not necessarily of wood, having a centrally arranged upstanding portion 3, hereinafter termed the bed, which bed is provided with a series of transverse channels 4, and a longitudinal channel 5 shaped and positioned to receive the corresponding cutting blades hereinafter noted. The channels 4 and 5 are of a depth to completely receive the respective cutting blade, so that an operation will cause the blades to pass wholly below the upper surface of the bed, thereby completely severing the individual blocks of butter from the mass and from each other.

The cutting element proper comprises a frame 6 preferably constructed of duplicate sections, each including a side bar 7, end bars 8 and handle portions 9 projected at right angles from the inner ends of the end bars, the corresponding end bars of each section being when the sections are assembled alined to present an end frame bar, the handle portions of each section being disposed in contact and projecting outwardly and centrally from each end frame bar, as clearly shown in Figs. 1 and 2.

The cutting blades include a longitudinal blade 10 and a series of transverse blades 11, all of said blades being removably secured in the frame. The blades are preferably metal strips of appropriate thickness, and each blade is independent, distinction in this particular being specifically made as compared with the usual cutter made up of an endless wire and wherein the breaking or rupture of any one of the blades compels the renewal of all. The transverse blades 11 are loosely and removably secured in place in the frame, by forming each end of each of said blades with a right angle extension 12 having a slightly inturned end 13, the length of the extension 12 appropriately spacing the adjacent blades. The transverse blades are held in place by seating the formed ends in longitudinal grooves 14 formed in the side bars 7 of the frame sections, as clearly shown in Fig. 3. The longitudinal blade 10 extends longitudinally of the frame, the respective ends thereof fitting between the handle portions 9 of each section and being formed with an opening 15 to engage a pin 16 projecting from one of the handle portions 9 and, when the parts are assembled, terminally seating in a recess 17 in the adjacent handle portion. As thus secured the longitudinal cutter bar is strained or under tension to maintain the rigidity, for cutting purposes of the transverse blades, the longitudinal blade being preferably formed with a series of notches 18 opening through the lower edge thereof to receive the transverse blades. The lower or cutting edges of all blades are preferably in the same plane.

The sections with the cutter frame are secured together by bolts 19 uniting the handle portions, as shown in Fig. 2. The handle member thus formed is provided with a vertically extending opening 20 which openings are appropriately placed to engage pins 21 rising from the block 2 beyond the bed 3, the coöperation of the frame and pins accurately guiding the former in operation, while at the same time permitting its free removal to place the butter on the bed or to remove the blocks after operation of the device.

In use the butter placed upon the bed is operated upon by moving the cutter frame downwardly, the respective blades severing the individual blocks and completely separating them one from another, as will be obvious.

In the event of breakage of any one of the transverse knives, the same may be readily removed and a new knife readily substituted, as each transverse knife is wholly independent of every other knife being merely held by the central knife and coöperation with the groove in the frame section. The matter of mounting the transverse knives constitutes one of the important details of the present invention.

What is claimed is:

1. A butter cutter including a bed, a cutter frame, opposing portions of the frame being formed with longitudinal grooves, and a series of transverse blades having laterally projected terminals to seat in said grooves.

2. A butter cutter including a bed, a cutter frame, opposing portions of the frame being formed with longitudinal grooves, and a series of transverse blades having laterally projected terminals to seat in said grooves, the ends of each terminal bearing against the adjacent blade to space the blades.

3. A butter cutter including a bed, a cutter frame, opposing portions of the frame being formed with longitudinal grooves, and a series of transverse blades having laterally projected terminals to seat in said grooves, and a longitudinal blade formed to engage each of the transverse blades.

4. A butter cutter including a bed, a cutter frame, opposing portions of the frame being formed with longitudinal grooves, a series of transverse blades having laterally projected terminals to seat in said grooves, a longitudinal blade formed to engage each of the transverse blades, and means to secure the longitudinal blade under tension in the frame.

5. A butter cutter including a bed, formed with a series of transverse and longitudinal channels to receive the cutting blades, a cutter frame, opposing portions of the frame being formed with longitudinal grooves, a series of transverse blades having laterally projected terminals to seat in said grooves, a longitudinal blade formed to engage each of the transverse blades, and means to secure the longitudinal blade under tension in the frame.

In testimony whereof, I affix my signature in presence of two witnesses.

CHARLES A. PATTERSON.

Witnesses:
S. M. LUDERS,
N. R. HOCKINSON.

Copies of this patent may be obtained for five cents each, by addressing the "Commissioner of Patents, Washington, D. C."